No. 768,033. Patented August 23, 1904.

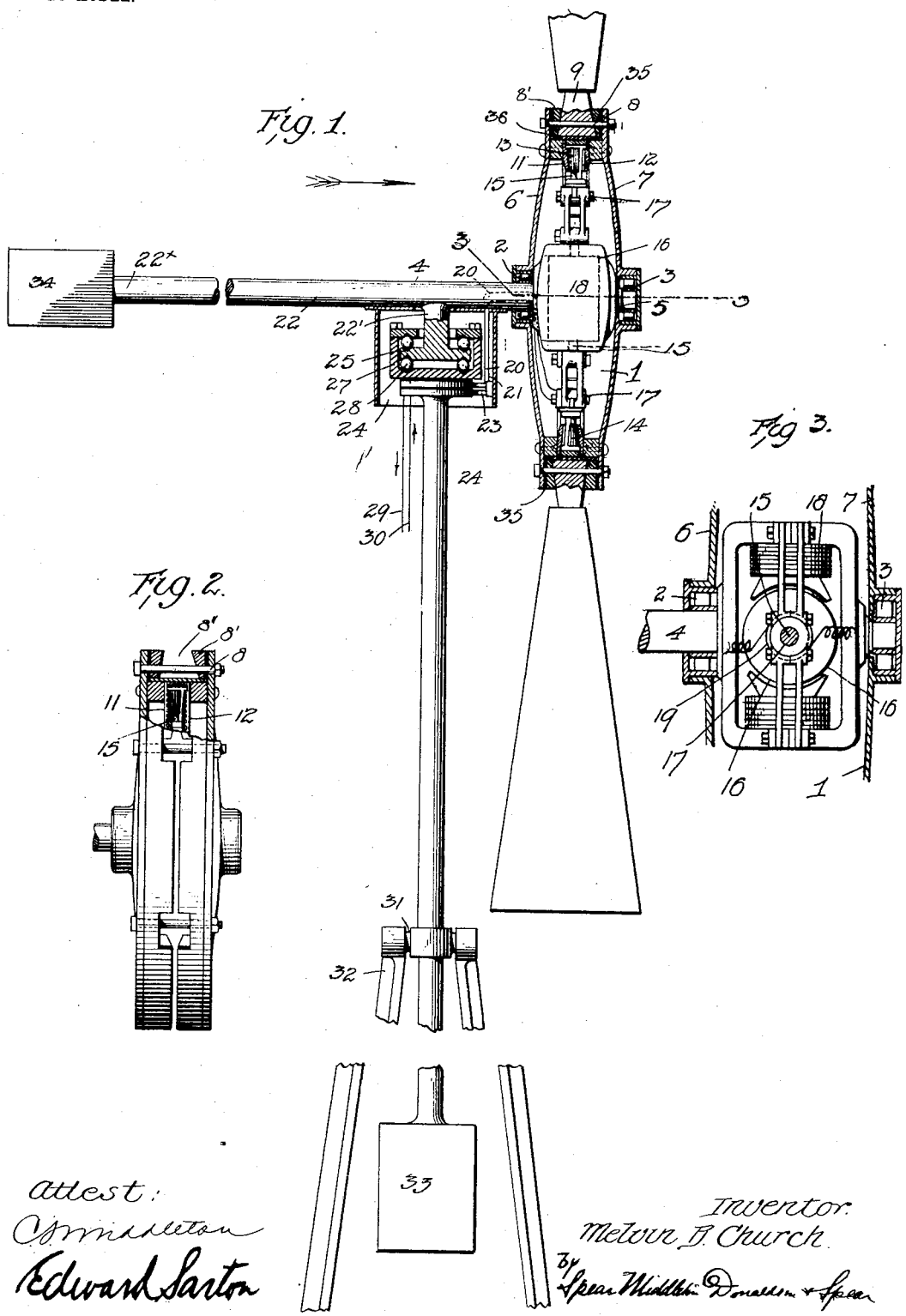

UNITED STATES PATENT OFFICE.

MELVIN B. CHURCH, OF GRAND RAPIDS, MICHIGAN.

WINDMILL.

SPECIFICATION forming part of Letters Patent No. 768,033, dated August 23, 1904.

Application filed March 30, 1904. Serial No. 200,819. (No model.)

*To all whom it may concern:*

Be it known that I, MELVIN B. CHURCH, a citizen of the United States, residing at Grand Rapids, Kent county, Michigan, have invented certain new and useful Improvements in Windmills, of which the following is a specification.

My invention relates to the generation of electricity, and particularly to an arrangement and combination of parts whereby it is possible to utilize a wind engine or mill as the source of power for driving the electric generating apparatus.

In carrying out my invention I design to employ driving connections of a direct character between the windmill proper and the generator adapted to impart the driving moment to the said generator in an equalized manner, said connections, as well as the generator, being inclosed within the hub or shell of the mill and imparting the power to the opposite ends of the armature-shaft from diametrically opposite points of the rotating head of the mill.

As is well known, a windmill at times revolves at a slow rate of speed—say twenty revolutions per minute—while for generating electricity it is necessary that the rotating member of the generator rotate at a much higher rate—say from five hundred to one thousand revolutions per minute. I aim to provide a windmill capable of producing this high rate of speed in the generator from the comparatively low speed of rotation of the windmill-head by preventing the absorption of power due to friction at the bearings, the arrangement being such that a balanced or equalizing effect is produced by the driving connections located at diametrically opposite points of the head.

Heretofore it has been necessary to introduce many steps or elements of gearing or sets of separate bearings to accomplish the change speed required in the gearing.

By my invention any desired degree of change speed in utilizing the wind-wheel for generating current is accomplished without the additions of any bearings beyond those for the ordinary axis of the mill and of the armature and the forces applied by the wheel to the driven member on either side are equal and their thrusts balance each other.

In the accompanying drawings, Figure 1 represents a windmill, in central vertical section, embodying my invention. Fig. 2 is a front view, partly broken away, of the hub or head of the windmill. Fig. 3 is a detail view on line 3 3 of Fig. 1 with parts in elevation.

In the drawings, 1 indicates the windmill-head, arranged to turn on bearings at 2 and 3 on the horizontal portion of the bracket 4 and its continuation 5. This head is in the form of a hollow shell composed of inner and outer sections 6 7, which are bolted together at 8 and hold between them rings or castings 8', having sockets 8'' for the shanks 9 of the blades of the wind-wheel. Within this head are arranged two circular racks 11 and 12, connected together with a space between them, one of said racks being located on each of the sections of the head, all forming one rotating body. They are of the same diameter and lie opposite each other. These racks are engaged by bevel-gears 13 and 14 on the shaft 15 of the armature 16, the said shaft extending at a slight inclination in respect to the plane of the racks, so that the gear 13 on one end of the armature-shaft will engage one of the racks—as, for instance, 11—while the gear 14 on the opposite end of the said inclined shaft will engage the other rack 12. The armature, which may be of any suitable construction, has its shaft-bearing at 17 in the bracket within the shell or head of the mill, and the field-magnets for said armature may be supported on the said bracket in an obvious manner, one of the said field-magnets being indicated generally at 18. The current generated is taken off from the commutator (indicated generally at 19, Fig. 3) by brushes in the ordinary manner.

The circuit-wires are indicated at 20 21, and these extend through the horizontal portion or stem 22 of the bracket and thence down to contact-brushes 23, which are supported in any suitable manner. I have shown them for convenience as being carried on the interior of a hood or shell 24, depending from the bracket-stem 22. These brushes bear on insulated contact-rings fixed to the standard or mast 24 of the windmill.

The connection between the stem of bracket 22 and the said mast or standard may be of any suitable construction adapted to permit the turning of the head of the windmill according to the direction of the wind, and as a representative form of any connection suitable for the purpose I show a disk or turntable 25 on the lower end of the vertical portion 22' of the bracket arranged within the box or bearing 27, fixed on the top of the mast. Antifriction-balls 28 are provided, as shown, above and below the turn-table, and the hood above mentioned covers all the parts of the turn-table and electrical contacts and protects the same from the weather. The electrical circuits are continued by the wires 29 30, connected with the contact-rings, and may lead to any suitable point of consumption or storage.

The mast or standard of the windmill may be pivoted at 31 to the parts 32 of the tower or framework, and on the end extending below this pivoted point I secure a weight 33 to hold the mast in upright position, said mast being adapted to be turned on the pivots, so that the wheel may be lowered for repairs. A weight 34 is also provided on the extension 22$^\times$ of the bracket 22, so as to counterbalance the weight of the wheel and its contained parts, and thus relieve the swivel connections of all lateral or twisting stress.

It will be noticed particularly that with the driving connections, as above described, between the head of the wheel and the shaft of the generator, in which the driving force is transmitted from diametrically opposite sides of the wheel, said wheel will be free from undue stress on one side of its bearings in respect to the other side, and said wheel will thus remain evenly balanced.

I interpose between the parts at the point 35 elastic packing, as indicated. The two-part socketed ring or casting has its members held together with the shanks of the blades by the same bolts which hold together the sections of the head of the windmill, and in drawing the parts together the parts will press upon the elastic material and through it will firmly grip the shanks of the blades, the compression continuing until the said sections bear firmly on the cross-plate 36, at which time the pinions are in proper mesh with the racks. The wheel will be automatically kept in the wind, as it will always assume a position in rear of the tower, as indicated by the arrow in Fig. 1, showing the direction of the wind.

I claim—

1. In combination with a wind-wheel, a turn-table, a bracket carried by the said turn-table, an electric generator supported on the bracket, an annular rack on the wheel and a pinion on the shaft of the generator engaging the said annular rack, said shaft extending from the center of the wheel toward its periphery.

2. In combination with a wind-wheel, an electric generator, and gearing between diametrically opposite points of said wheel and the opposite ends of the shaft of the generator for driving the said shaft, substantially as described.

3. In combination with the wheel of a windmill, an electric generator inclosed within the head of said wheel, said head carrying double annular racks and gears on the opposite ends of the armature-shaft, one of said gears meshing with one of the racks while the other gear meshes with the other of said racks, substantially as described.

4. In combination in a windmill, a turn-table, a bracket extending therefrom upon which the wind-wheel is free to turn, an electric generator supported on the said bracket, and having its shaft extending in opposite directions and diametrically of the said wheel, pinions on the opposite ends of the said shaft, and annular racks on the wind-wheel, one of which engages one pinion and the other of which engages the other pinion, substantially as described.

5. In combination in a windmill, a wind-wheel having a double annular rack carried thereby, a swiveled bracket on which the said wind-wheel is free to turn, and an electric generator supported on the said swiveled bracket and within the windmill, and having pinions on its opposite ends, said shaft being slightly inclined to the plane of the racks whereby one pinion engages one rack and the other pinion engages the other rack at a diametrically opposite point, substantially as described.

6. In combination with a windmill, a turn-table, a bracket carried thereby supporting the wind-wheel, an electric generator supported on the bracket, and contact-rings and contacts at the turn-table, and circuit-wires leading from said contacts and rings, substantially as described.

7. In combination with a windmill having a head composed of sections, carrying annular racks, an electric generator having its shaft provided with pinions engaging the said racks, means for clamping the sections together and wind-wheel blades held between the said sections, substantially as described.

8. In combination with the wind-wheel composed of sections, and each section having an annular rack, an electric generator within the wind-wheel having its shaft provided with pinions engaging the racks, wind-wheel blades having their shanks arranged between the sections of the wheel, means for holding the sections together, an elastic packing interposed between the clamped parts, substantially as described.

In testimony whereof I affix my signature in presence of two witnesses.

MELVIN B. CHURCH.

Witnesses:
HENRY E. COOPER,
EDWARD SARTOU.